United States Patent
Vaidyanathan et al.

(10) Patent No.: US 8,355,999 B2
(45) Date of Patent: Jan. 15, 2013

(54) INFERENCE OF ALTITUDE USING PAIRWISE COMPARISON OF TELEMETRY/TEMPERATURE SIGNALS USING REGRESSION ANALYSIS

(75) Inventors: Kalyanaraman Vaidyanathan, San Diego, CA (US); Kenny C. Gross, San Diego, CA (US); Ramakrishna C. Dhanekula, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 458 days.

(21) Appl. No.: 12/760,144

(22) Filed: Apr. 14, 2010

(65) Prior Publication Data

US 2011/0258157 A1  Oct. 20, 2011

(51) Int. Cl.
*G06F 15/18* (2006.01)
(52) U.S. Cl. .................................................. 706/12

(58) Field of Classification Search .................... 706/12, 706/45, 62
See application file for complete search history.

(56) References Cited

U.S. PATENT DOCUMENTS 7,801,650 B2 * 9/2010 Gross et al. ..................... 701/14

* cited by examiner

*Primary Examiner* — David Vincent
(74) *Attorney, Agent, or Firm* — Park, Vaughan, Fleming & Dowler LLP; Chia-Hsin Suen (57) ABSTRACT

Some embodiments provide a system that analyzes telemetry data from a computer system. During operation, the system obtains the telemetry data as a set of telemetric signals using a set of sensors in the computer system, wherein the set of sensors includes temperature sensors at different locations in a cooling airflow through the computer system. Next, the system calculates a set of pairwise temperature differences from the telemetric signals. The system then infers an altitude of the computer system based on the pairwise temperature differences. Finally, the system uses the inferred altitude to manage the operation of the computer system.

20 Claims, 6 Drawing Sheets

INFERENCE OF ALTITUDE USING PAIRWISE COMPARISON OF TELEMETRY/TEMPERATURE SIGNALS USING REGRESSION ANALYSIS

RELATED APPLICATION

This application is related to a co-pending U.S. patent application Ser. No. 11/521,752, entitled "Inferring the Altitude of Computing Devices Using Multivariate Pattern Recognition of Telemetry Signals," and filed on 15 Sep. 2006 by inventors Kenneth C. Gross and Kalyanamaran Vaidyanathan

BACKGROUND

1. Field

The present embodiments relate to techniques for monitoring and analyzing computer systems. More specifically, the present embodiments relate to a method and system for inferring the altitude of a computer system by analyzing telemetry data from the computer system.

2. Related Art

As described by Moore's Law, integrated circuit (IC) performance continues to increase at an exponential rate. However, these performance improvements are typically accompanied by corresponding increases in complexity and sensitivity to the environment. In particular, vibration-related problems are increasingly prominent in high-performance computer systems such as servers, mainframes, and supercomputers. These vibration-related problems may be caused by several factors. First, cooling fans have increased in power to compensate for the additional heat generated by the machines' hardware components. In addition, cheaper and lighter materials in chassis and support structures are less effective at dampening vibrations than heavier and more expensive materials. Finally, newer generations of hard disk drives (HDDs) are more sensitive to vibration-induced degradation.

More specifically, HDDs have increased in both storage density and performance in accordance with Moore's Law. At these increased densities, a write head of an HDD may be required to hit a track that is less than 20 nanometers in width, while the write head may be separated from a corresponding platter by a distance of several nanometers. Finally, the platter may spin at speeds of up to 15,000 revolutions per minute (rpm). These factors have caused the latest generation of HDDs to be more sensitive to vibrations. Consequently, vibration-related problems may cause the HDDs within a computer system to experience reductions in read and write throughput. Moreover, the increased internal latencies caused by the degraded throughput may cause software applications to hang, crash, and/or reboot.

Similarly, single-event upsets (SEUs) from cosmic radiation may affect processor and/or memory state. SEUs may also propagate to become soft errors in computer systems. Because sensitivity to SEUs increases with higher gate densities and lower voltages, soft error rates (SERs) may grow with successive generations of ICs.

Furthermore, altitude may affect the propagation of both vibrations and SEUs in computer systems. First, thinner air at higher altitudes may result in higher fan speeds that increase vibration-induced degradation, noise, and/or energy consumption. Higher fan speeds may additionally produce vibrations at the resonant frequency of a chassis, resulting in accelerated failure rates for machines and components at that altitude.

Second, cosmic ray flux may increase by a factor of about 2.2 for every 1,000 m increase in altitude. As a result, SERs for computers at high altitude may be an order of magnitude higher than SERs for computers at sea level. Consequently, the use of soft error rate discrimination (SERD) thresholds that do not account for altitude may result in a large number of false alarms and/or poor discrimination sensitivity.

Hence, altitude information may facilitate the diagnosis and remediation of degradation in computer systems.

SUMMARY

The disclosed embodiments provide a system that analyzes telemetry data from a computer system. During operation, the system obtains the telemetry data as a set of telemetric signals using a set of sensors in the computer system, wherein the set of sensors includes temperature sensors at different locations in a cooling airflow through the computer system. Next, the system calculates a set of pairwise temperature differences from the telemetric signals. The system then infers an altitude of the computer system based on the pairwise temperature differences. Finally, the system uses the inferred altitude to manage the operation of the computer system.

In some embodiments, the system also dequantizes the telemetric signals prior to calculating the pairwise temperature differences.

In some embodiments, the system further infers the altitude of the computer system using a nonlinear, non-parametric regression technique.

In some embodiments, the altitude of the computer system is further inferred by:
  (i) obtaining a first altitude inference using the pairwise temperature differences;
  (ii) obtaining a second altitude inference using the nonlinear, non-parametric regression technique; and
  (iii) calculating a weighted average of the first altitude inference and the second altitude inference.

In some embodiments, each of the pairwise temperature differences is calculated by:
  (i) obtaining a first temperature signal associated with an upstream sensor in the cooling airflow through the computer system;
  (ii) obtaining a second temperature signal associated with a downstream sensor in the cooling airflow; and
  (iii) subtracting the first temperature signal from the second temperature signal.

In some embodiments, inferring the altitude of the computer system based on the pairwise temperature differences involves:
  (i) using a linear model to generate a set of altitude estimates from the pairwise temperature differences; and
  (ii) calculating a weighted average of the altitude estimates.

In some embodiments, the weighted average is calculated based on a variance of each of the altitude estimates.

In some embodiments, using the inferred altitude to manage the operation of the computer system involves at least one of adjusting a threshold for a soft error rate discrimination (SERD) technique, and adjusting a fan speed of the computer system.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
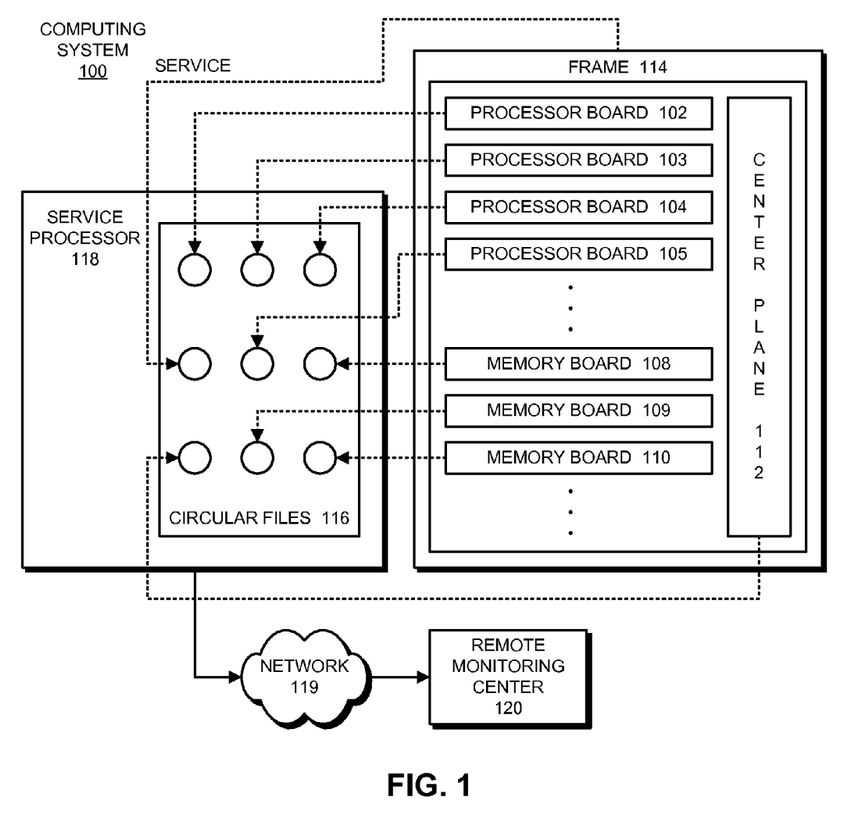
FIG. 1 shows a computer system which includes a service processor for processing telemetry signals in accordance with an embodiment.

FIG. 1 shows a computer system which includes a service processor for processing telemetry signals in accordance with an embodiment. As is illustrated in FIG. 1, computer system 100 includes a number of processor boards 102-105 and a number of memory boards 108-110, which communicate with each other through center plane 112. These system components are all housed within a frame 114.

In one or more embodiments, these system components and frame 114 are all "field-replaceable units" (FRUs), which are independently monitored as is described below. Note that all major system units, including both hardware and software, can be decomposed into FRUs. For example, a software FRU can include an operating system, a middleware component, a database, or an application.

Computer system 100 is associated with a service processor 118, which can be located within computer system 100, or alternatively can be located in a standalone unit separate from computer system 100. For example, service processor 118 may correspond to a portable computing device, such as a mobile phone, laptop computer, personal digital assistant (PDA), and/or portable media player. Service processor 118 may include a monitoring mechanism that performs a number of diagnostic functions for computer system 100. One of these diagnostic functions involves recording performance parameters from the various FRUs within computer system 100 into a set of circular files 116 located within service processor 118. In one embodiment of the present invention, the performance parameters are recorded from telemetry signals generated from hardware sensors and software monitors within computer system 100. In one or more embodiments, a dedicated circular file is created and used for each FRU within computer system 100. Note that this circular file can have a three-stage structure as is described below with reference to FIG. 2.

The contents of one or more of these circular files 116 can be transferred across network 119 to remote monitoring center 120 for diagnostic purposes. Network 119 can generally include any type of wired or wireless communication channel capable of coupling together computing nodes. This includes, but is not limited to, a local area network (LAN), a wide area network (WAN), a wireless network, and/or a combination of networks. In one or more embodiments, network 119 includes the Internet. Upon receiving one or more circular files 116, remote monitoring center 120 may perform various diagnostic functions on computer system 100, as described below with respect to FIGS. 2-3. The system of FIG. 1 is described further in U.S. Pat. No. 7,020,802 (issued Mar. 28, 2006), by inventors Kenny C. Gross and Larry G. Votta, Jr., entitled "Method and Apparatus for Monitoring and Recording Computer System Performance Parameters," which is incorporated herein by reference.

Figure 2:
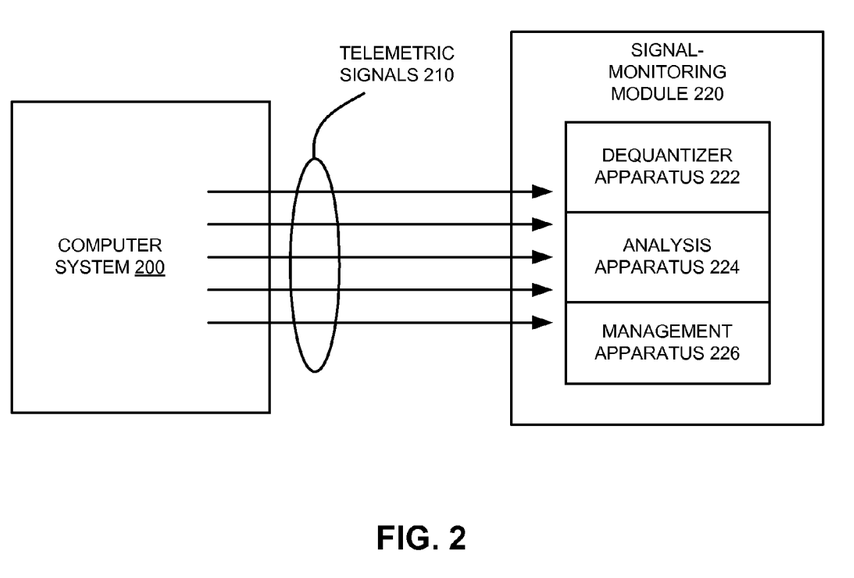
FIG. 2 shows a telemetry analysis system which examines both short-term real-time telemetry data and long-term historical telemetry data in accordance with an embodiment.

FIG. 2 shows a telemetry analysis system which examines both short-term real-time telemetry data and long-term historical telemetry data in accordance with an embodiment. In this example, a computer system 200 is monitored using a number of telemetric signals 210, which are transmitted to a signal-monitoring module 220. Signal-monitoring module 220 may assess the state of computer system 200 using telemetric signals 210. For example, signal-monitoring module 220 may analyze telemetric signals 210 to detect and manage faults in computer system 200.

Signal-monitoring module 220 may be provided by and/or implemented using a service processor associated with computer system 200. Alternatively, signal-monitoring module 220 may reside within a remote monitoring center (e.g., remote monitoring center 120 of FIG. 1) that obtains telemetric signals 210 from computer system 200 over a network connection. Moreover, signal-monitoring module 220 may include functionality to analyze both real-time telemetric signals 210 and long-term historical telemetry data. For example, signal-monitoring module 220 may be used to detect anomalies in telemetric signals 210 received directly from the monitored computer system(s). Signal-monitoring module 220 may also be used in offline detection of anomalies from the monitored computer system(s) by processing archived and/or compressed telemetry data associated with the monitored computer system(s).

Telemetric signals 210 may correspond to load metrics, CPU utilizations, idle times, memory utilizations, disk activity, transaction latencies, temperatures, voltages, fan speeds, and/or currents. However, computer system 200 may lack a sensor for measuring altitude. Thus, the monitoring and management of computer system 200 may proceed without altitude information. Furthermore, the lack of a known altitude for computer system 200 may cause degradation, failures, and/or other issues in computer system 200.

For example, the use of computer system 200 at a high altitude may increase fan speeds, which in turn may increase power consumption, noise, and/or vibrational degradation. Higher-than-normal fan speeds may also generate vibrations at the resonant frequency of the chassis in computer system 200, resulting in accelerated failure rates for components such as hard disk drives (HDDs) in computer system 200. Similarly, soft error rates (SERs) for computers at high altitude may be an order of magnitude higher than SERs for computers at sea level. Consequently, the use of soft error rate discrimination (SERD) thresholds that do not account for altitude may result in a large number of false alarms and/or poor discrimination sensitivity during monitoring of computer system 200.

In one or more embodiments, signal-monitoring module 220 includes functionality to infer the altitude of computer system 200 based on telemetric signals 210. For example, signal-monitoring module 220 may analyze telemetric signals 210 to infer the altitude of computer system 200 if computer system 200 does not include an altimeter and/or other mechanism for measuring altitude.

To monitor computer system 200, signal-monitoring module 220 may obtain telemetric signals 210 using sensors in computer system 200. More specifically, telemetric signals 210 may be obtained from temperature sensors at different locations in a cooling airflow through the computer system. As discussed below, such temperature sensors may be grouped into pairs of sensors that include one upstream sensor and one downstream sensor from the cooling airflow.

Furthermore, a number of components in signal-monitoring module 220 may process and/or analyze telemetric signals 210. In particular, a dequantizer apparatus 222 may remove quantization effects associated with low-resolution (e.g., 8-bit) analog-to-digital (A/D) conversion of high-resolution signals (e.g., telemetric signals 210). Such quantization effects may produce inaccuracies during the analysis of telemetric signals 210 and may prevent signal-monitoring module 220 from detecting subtle anomalies that precede faults or failures in computer system 200. The functionality of dequantizer apparatus 222 is described in U.S. Pat. No. 7,248,980 (issued Jul. 24, 2007), by inventors Kenny C. Gross, Ramakrishna C. Dhanekula, Eugenio J. Schuster, and Gregory A. Cumberford, entitled "Method and Apparatus for Removing Quantization Effects in a Quantization Signal," and by U.S. Pat. No. 7,292,962 (issued Nov. 6, 2007), by inventors Kenneth C. Gross and Keith Whisnant, entitled "Technique for Detecting Changes in Signals that are Measured by Quantization," which are incorporated herein by reference.

Next, an analysis apparatus 224 in signal-monitoring module 220 may calculate a set of pairwise temperature differences from telemetric signals 210. The pairwise temperature differences may be calculated from all pairs of temperature signals that include a first temperature signal associated with an upstream sensor in computer system 200 and a second temperature signal associated with a downstream sensor in computer system 200. To calculate a pairwise temperature difference between an upstream sensor and a downstream sensor, analysis apparatus 224 may subtract the first temperature signal from the second temperature signal.

In one or more embodiments, a pair of sensors includes an upstream sensor and a downstream sensor if one sensor (e.g., the upstream sensor) is positioned closer to a cooling source (e.g., a cooling fan) than the other sensor (e.g., the downstream sensor). The relative proximities of the upstream and downstream sensors to the cooling source may cause the first temperature signal to be lower than the second temperature signal. In addition, the temperature difference between the two sensors may increase with altitude, as the effectiveness of air-cooling decreases with air pressure.

As a result, analysis apparatus 224 may effectively leverage pairwise temperature differences into an accurate inference of the altitude of computer system 200. To infer the altitude of computer system 200 based on the pairwise temperature differences, analysis apparatus 224 may use a linear model to generate a set of altitude estimates from the pairwise temperature differences. The linear model may be generated from telemetric signals obtained from a computer system of the same platform as computer system 200. In addition, the telemetric signals may be obtained at a variety of altitudes. For example, the telemetric signals may be collected as the altitude in an altitude chamber containing the computer system is varied. Generation of a linear model for an altitude of a computer system is discussed in further detail below with respect to FIG. 5.

More specifically, the linear model may include a linear equation for each pairwise temperature difference calculated from telemetric signals 210. For example, the linear equation for the $i^{th}$ pairwise temperature difference may take the form:

$$Alt_i = m_i * \Delta T_i + b_i$$

where $Alt_i$ represents the altitude estimate for the $i^{th}$ pairwise temperature difference, $\Delta T_i$ represents the $i^{th}$ pairwise temperature difference, and $m_i$ and $b_i$ establish the linear relationship between the altitude estimate and the pairwise temperature difference. The altitude estimates may thus be calculated by plugging the pairwise temperature differences into the corresponding equations from the linear model.

Analysis apparatus 224 may then calculate the inferred altitude as a weighted average of the altitude estimates. For example, analysis apparatus 224 may infer the altitude of computer system 200 using the following equation:

$$Alt = \Sigma(w_i * Alt_i)/n$$

In other words, the inferred altitude Alt may be obtained by multiplying each altitude estimate $Alt_i$ by a corresponding weight $w_i$, summing up the products, and dividing by the number of altitude estimates n.

The weighted average may allow analysis apparatus 224 to adjust the contribution of each altitude estimate to the final inferred altitude. For example, analysis apparatus 224 may compute the weight for an altitude estimate as a function of the altitude estimate's variance. As a result, altitude estimates that are less consistent (e.g., have more variance) may contribute less to the final altitude estimate than altitude estimates that are more consistent (e.g., have less variance).

Analysis apparatus 224 may also include functionality to infer the altitude of computer system 200 using other techniques and/or models. In particular, analysis apparatus 224 may also infer the altitude by applying a nonlinear, non-parametric regression technique, such as a multivariate state estimation technique (MSET), to telemetric signals 210. Altitude inference using nonlinear, non-parametric regression techniques is discussed further in a co-pending application by inventors Kenneth C. Gross and Kalyanamaran Vaidyanathan and filed on 15 Sep. 2006, having serial number No. 11/521,752, entitled "Inferring the Altitude of Computing Devices Using Multivariate Pattern Recognition of Telemetry Signals" which is incorporated herein by reference.

Moreover, analysis apparatus 224 may combine multiple altitude estimates into the inferred altitude to increase the robustness of the altitude inference. To infer the altitude of computer system 200 using both pairwise temperature differences and nonlinear non-parametric regression, analysis apparatus 224 may obtain a first altitude inference using the pairwise temperature differences and obtain a second altitude inference using a nonlinear, non-parametric regression technique. Analysis apparatus 224 may then obtain the inferred altitude as a weighted average of the first altitude inference and the second altitude inference. For example, analysis apparatus 224 may weigh the first and second altitude inferences inversely with the variances of the altitude inferences. As a result, increased uncertainty (e.g., variance) in a technique may be selectively de-emphasized in the weighted average, while consistency may be emphasized to maintain robustness over the lifetime of computer system 200.

Because errors in one technique may be offset by the other technique, the combined inferred altitude may be more accurate over time than the individual altitude inferences of one or both techniques. For example, the nonlinear non-parametric regression technique may react to calibration drift of sensors in computer system 200 in different ways. More specifically, the linear model may decrease in accuracy as individual temperature sensors drift out of calibration over the lifetime of computer system 200. On the other hand, the nonlinear non-parametric regression technique may be based on correlations among various physical variables (e.g., fan speeds, currents, voltages, temperatures) and may thus decrease in accuracy if aging phenomena in computer system 200 cause long-term variations in the correlation patterns among the physical variables. As a result, the weighted average of the two altitude inferences may be more accurate than each altitude inference by itself, particularly after a certain point in the life of computer system 200.

The inferred altitude may then be used by a management apparatus 226 in signal-monitoring module 220 to manage the operation of computer system 200. First, management apparatus 226 may use the inferred altitude to adjust a threshold for a soft error rate discrimination (SERD) technique that analyzes soft error rates (SERs) to detect degradation in computer system 200. For example, management apparatus 226 may increase the SERD threshold if computer system 200 is inferred to be at a high altitude and decrease the SERD threshold if computer system 200 is inferred to be at an altitude that is below a default altitude for SERD.

Next, management apparatus 226 may use the inferred altitude to adjust a fan speed of computer system 200. For example, management apparatus 226 may reduce the fan speed of cooling fans in computer system 200 if computer system 200 is inferred to be at a high altitude. Such reduction of fan speeds may mitigate vibrational degradation in computer system 200, prevent failures caused by resonating fan speeds in computer system 200, reduce energy consumption in computer system 200, and/or decrease noise in and around computer system 200.

Figure 3:
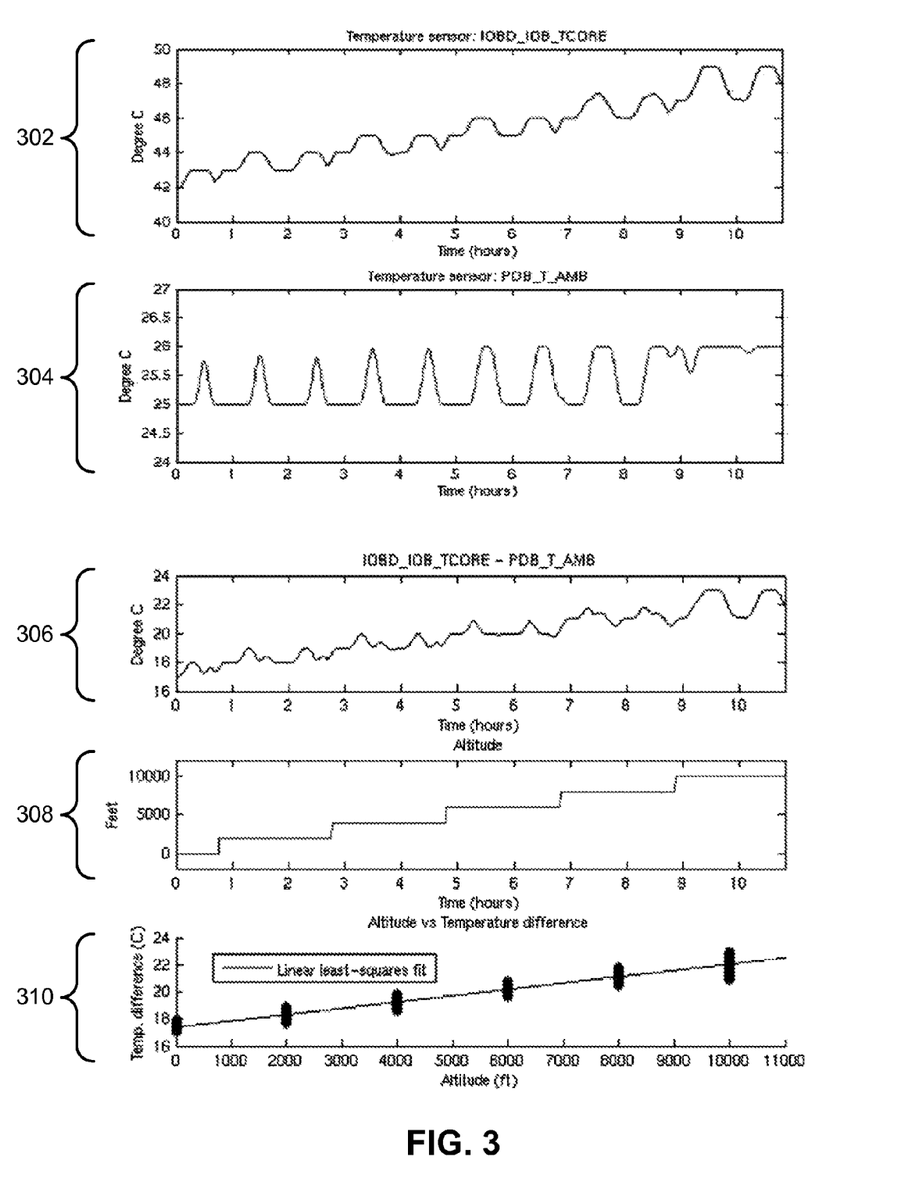
FIG. 3 shows an exemplary set of plots in accordance with an embodiment.

FIG. 3 shows an exemplary set of plots 302-310 in accordance with an embodiment. Plots 302-304 may correspond to temperature signals from sensors in a computer system. For example, data in plot 304 may be obtained from an upstream sensor, while data in plot 302 may be obtained from a downstream sensor that is farther from a cooling source than the upstream sensor. In addition, plot 306 shows a set of pairwise temperature differences that may be calculated by subtracting the temperature values in plot 304 from temperature values in plot 302.

As shown in FIG. 3, the pairwise temperature differences in plot 306 increase over time. The increase may be caused by an increase in the altitude of the computer system that is displayed in plot 308. For example, data in plots 302-308 may be obtained by placing the computer system in an altitude chamber and increasing the altitude from sea level to 10,000 feet in periodic increments. The data may then be analyzed to generate a linear model (e.g., linear equation) of altitude versus pairwise temperature difference for the sensors. Furthermore, the linear model may be displayed in plot 310, along with data points from plots 306-308 used to create the linear model.

Subsequent inferences of altitude for the computer system and/or a computer system on the same platform may be made by obtaining temperature values from the sensors, calculating the pairwise temperature difference of the temperature values, and inputting the pairwise temperature difference into the linear model. The output of the linear model may then be taken as the inferred altitude of the computer system.

Figure 4:
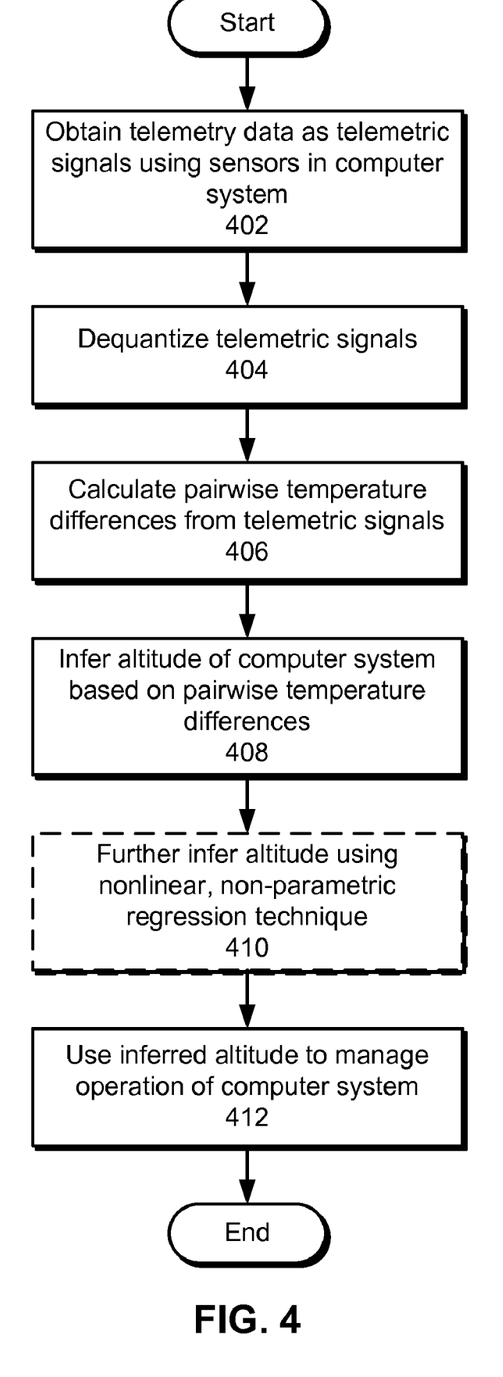
FIG. 4 shows a flowchart illustrating the process of analyzing telemetry data from a computer system in accordance with an embodiment.

FIG. 4 shows a flowchart illustrating the process of analyzing telemetry data from a computer system in accordance with an embodiment. In one or more embodiments, one or more of the steps may be omitted, repeated, and/or performed in a different order. Accordingly, the specific arrangement of steps shown in FIG. 4 should not be construed as limiting the scope of the technique.

First, the telemetry data is obtained as a set of telemetric signals using a set of sensors in the computer system (operation 402). The sensors may include temperature sensors at different locations in a cooling airflow through the computer system. Next, the telemetric signals are dequantized (operation 404) to increase the resolution of the telemetric signals. A set of pairwise temperature differences is then calculated from the telemetric signals (operation 406). Each pairwise temperature difference may be calculated by obtaining a first temperature signal associated with an upstream sensor in the computer system, obtaining a second temperature signal associated with a downstream sensor in the computer system, and subtracting the first temperature signal from the second temperature signal. Moreover, a pairwise temperature difference may be calculated for every pair of sensors in the computer system that contains an upstream sensor that is closer to a cooling source than a downstream sensor.

The altitude of the computer system is inferred based on the pairwise temperature differences (operation 408). First, a linear model is used to generate a set of altitude estimates from the pairwise temperature differences. Next, a weighted average of the altitude estimates is calculated and obtained as the inferred altitude. The altitude may optionally be further inferred using a nonlinear, non-parametric regression technique (operation 410). To further infer the altitude, a first altitude inference may be obtained using the pairwise temperature differences, and a second altitude inference may be obtained using the nonlinear, non-parametric regression technique. The inferred altitude may then be obtained by calculating a weighted average of the first altitude inference and the second altitude inference.

Finally, the inferred altitude is used to manage the operation of the computer system (operation 412). For example, the inferred altitude may be used to adjust an SERD threshold and/or a fan speed of the computer system. Consequently, the inferred altitude may facilitate the altitude-based monitoring and/or management of the computer system, even if the computer system lacks an altimeter.

Figure 5:
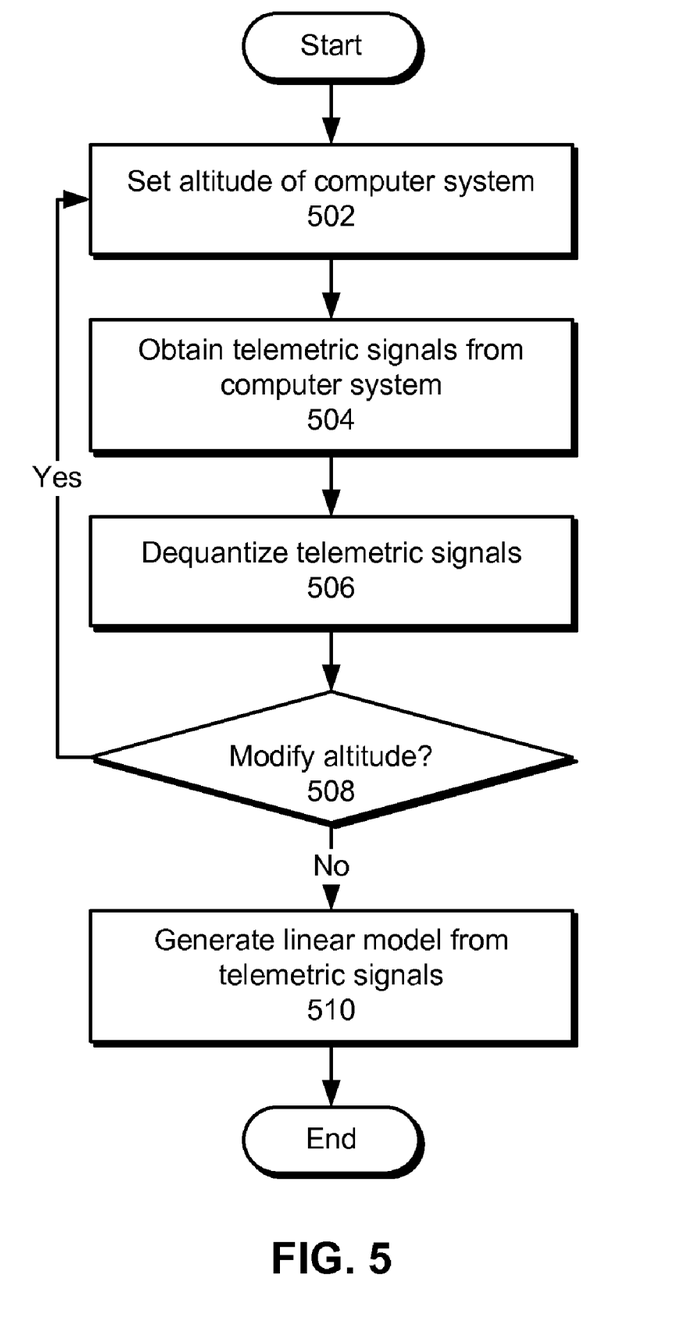
FIG. 5 shows a flowchart illustrating the process of generating a linear model for the altitude of a computer system in accordance with an embodiment.

FIG. 5 shows a flowchart illustrating the process of generating a linear model for the altitude of a computer system in accordance with an embodiment. In one or more embodiments, one or more of the steps may be omitted, repeated, and/or performed in a different order. Accordingly, the specific arrangement of steps shown in FIG. 5 should not be construed as limiting the scope of the technique.

Initially, the altitude of the computer system is set (operation 502). For example, the altitude of the computer system may be set by placing the computer system in an altitude chamber. Next, a set of telemetric signals is obtained from the computer system (operation 504) and dequantized (operation 506). The telemetric signals may include temperature signals from every sensor included in a pair of sensors that contain an upstream sensor and a downstream sensor.

The altitude may also be modified (operation 508). For example, the altitude may be modified to enable the collection of telemetric signals from the computer system at various altitudes in increments of 1,000 feet between sea level and 10,000 feet. If the altitude is to be modified (operation 508), the altitude is set (operation 502) to a new value, and telemetric signals are obtained from the computer system (operation 504) at the new altitude and dequantized (operation 506). Operations 502-508 may thus be repeated until telemetric signals associated with all desired altitudes have been collected from the computer system.

Finally, the linear model is generated from the telemetric signals (operation 510). For example, the linear model may be generated by calculating pairwise temperature differences of all pairs of temperature signals associated with an upstream sensor and a downstream sensor. Pairwise temperature differences for each pair of sensors containing an upstream sensor and a downstream sensor may then be used to build a linear equation that describes the relationship between the altitude and differences in temperature signals from the two sensors. As a result, the number of linear equations in the linear model may equal the number of sensor pairs containing an upstream sensor and a downstream sensor.

Figure 6:
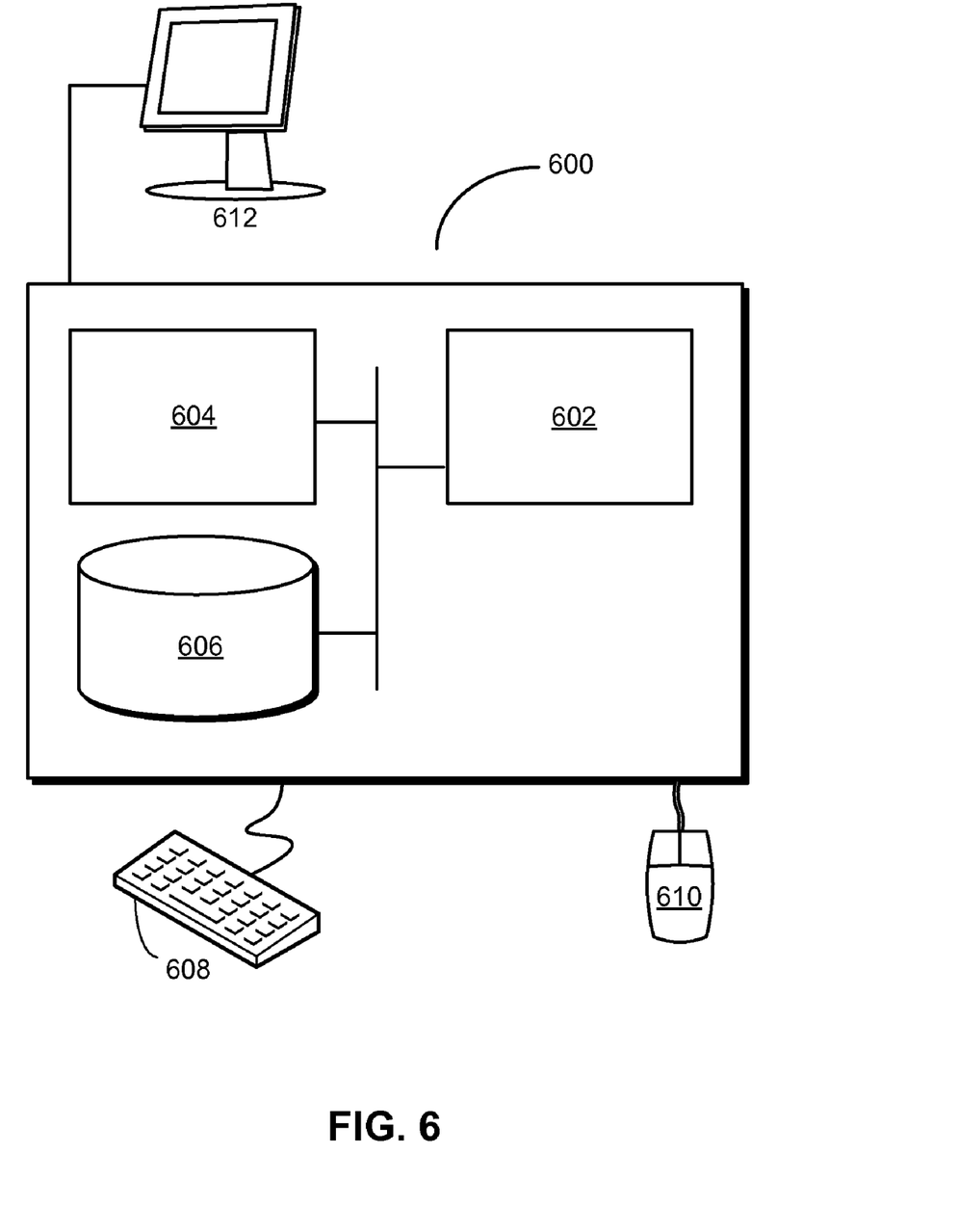
FIG. 6 shows a computer system in accordance with an embodiment.

FIG. 6 shows a computer system 600. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In particular, computer system 600 may implement a signal-monitoring module that analyzes telemetry data from a monitored system. The signal-monitoring module may include a dequantizer apparatus that dequantizes a set of telemetric signals from the monitored system. The signal-monitoring module may also include an analysis apparatus that calculates a set of pairwise temperature differences from the telemetric signals and infers an altitude of the computer system based on the pairwise temperature differences. Finally, the signal-monitoring module may include a management apparatus that uses the inferred altitude to manage the operation of the computer system.

In addition, one or more components of computer system 600 may be remotely located and connected to the other components over a network. Portions of the present embodiments (e.g., monitoring mechanism, signal-monitoring module, dequantizer apparatus, analysis apparatus, management apparatus, etc.) may also be located on different nodes of a distributed system that implements the embodiments. For example, the present embodiments may be implemented using a cloud computing system that provides a remote monitoring and analysis framework for a set of computer servers, avionics electronics systems, and/or medical electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for analyzing telemetry data from a computer system, comprising:
    obtaining the telemetry data as a set of telemetric signals using a set of sensors in the computer system;
    calculating a set of pairwise temperature differences from the telemetric signals;
    using a regression analysis to infer an altitude of the computer system based on the pairwise temperature differences; and
    using the inferred altitude to manage the operation of the computer system.

2. The computer-implemented method of claim 1, further comprising:
    dequantizing the telemetric signals prior to calculating the pairwise temperature differences.

3. The computer-implemented method of claim 1, wherein using the regression analysis involves using a nonlinear, non-parametric regression technique.

4. The computer-implemented method of claim 3, wherein the altitude of the computer system is further inferred by:
    obtaining a first altitude inference using the pairwise temperature differences;
    obtaining a second altitude inference using the nonlinear, non-parametric regression technique; and
    calculating a weighted average of the first altitude inference and the second altitude inference.

5. The computer-implemented method of claim 1, wherein each of the pairwise temperature differences is calculated by:
    obtaining a first temperature signal associated with an upstream sensor in a cooling airflow through the computer system;
    obtaining a second temperature signal associated with a downstream sensor in the cooling airflow; and
    subtracting the first temperature signal from the second temperature signal.

6. The computer-implemented method of claim 1, wherein inferring the altitude of the computer system based on the pairwise temperature differences involves:
    using a linear model to generate a set of altitude estimates from the pairwise temperature differences; and
    calculating a weighted average of the altitude estimates.

7. The computer-implemented method of claim 6, wherein the weighted average is calculated based on a variance of each of the altitude estimates.

8. The computer-implemented method of claim 1, wherein using the inferred altitude to manage the operation of the computer system involves at least one of:
- adjusting a threshold for a soft error rate discrimination (SERD) technique; and
- adjusting a fan speed of the computer system.

9. A system for analyzing telemetry data from a computer system, comprising:
- a monitoring mechanism configured to obtain the telemetry data as a set of telemetric signals using a set of sensors in the computer system; and
- a fault-monitoring module configured to:
  - calculate a set of pairwise temperature differences from the telemetric signals;
  - use a regression technique to infer an altitude of the computer system based on the pairwise temperature differences; and
  - use the inferred altitude to manage the operation of the computer system.

10. The system of claim 9, further comprising:
- a dequantizer apparatus configured to dequantize the telemetric signals prior to calculating the pairwise temperature differences.

11. The system of claim 9, wherein the regression technique includes a nonlinear, non-parametric regression technique.

12. The system of claim 11, wherein the altitude of the computer system is inferred by:
- obtaining a first altitude inference using the pairwise temperature differences;
- obtaining a second altitude inference using the nonlinear, non-parametric regression technique; and
- calculating a weighted average of the first altitude inference and the second altitude inference.

13. The system of claim 9, wherein each of the pairwise temperature differences is calculated by:
- obtaining a first temperature signal associated with an upstream sensor in a cooling airflow through the computer system;
- obtaining a second temperature signal associated with a downstream sensor in the cooling airflow; and
- subtracting the first temperature signal from the second temperature signal.

14. The system of claim 9, wherein inferring the altitude of the computer system based on the pairwise temperature differences involves:
- using a linear model to generate a set of altitude estimates from the pairwise temperature differences; and
- calculating a weighted average of the altitude estimates.

15. A non-transitory computer-readable storage medium storing instructions that when executed by a computer cause the computer to perform a method for analyzing telemetry data from a computer system, the method comprising:
- obtaining the telemetry data as a set of telemetric signals using a set of sensors in the computer system;
- calculating a set of pairwise temperature differences from the telemetric signals;
- using a regression analysis to infer an altitude of the computer system based on the pairwise temperature differences; and
- using the inferred altitude to manage the operation of the computer system.

16. The computer-readable storage medium of claim 15, the method further comprising:
- dequantizing the telemetric signals prior to calculating the pairwise temperature differences.

17. The computer-readable storage medium of claim 15, wherein using the regression analysis involves using a nonlinear, non-parametric regression technique.

18. The computer-readable storage medium of claim 17, wherein the altitude of the computer system is further inferred by:
- obtaining a first altitude inference using the pairwise temperature differences;
- obtaining a second altitude inference using the nonlinear, non-parametric regression technique; and
- calculating a weighted average of the first altitude inference and the second altitude inference.

19. The computer-readable storage medium of claim 15, wherein each of the pairwise temperature differences is calculated by:
- obtaining a first temperature signal associated with an upstream sensor in a cooling airflow through the computer system;
- obtaining a second temperature signal associated with a downstream sensor in the cooling airflow; and
- subtracting the first temperature signal from the second temperature signal.

20. The computer-readable storage medium of claim 15, wherein inferring the altitude of the computer system based on the pairwise temperature differences involves:
- using a linear model to generate a set of altitude estimates from the pairwise temperature differences; and
- calculating a weighted average of the altitude estimates.

* * * * *